(12) United States Patent
Kimener (10) Patent No.: US 10,308,450 B2
(45) Date of Patent: Jun. 4, 2019

(54) TRAILER STABILIZER AND LEVELER

(71) Applicant: Stabilock, LLC, Loveland, OH (US)

(72) Inventor: Thomas Terrance Kimener, Loveland, OH (US)

(73) Assignee: Stabilock, LLC, Loveland, OH (US)

( * ) Notice: Subject to any disclaimer, the term of this patent is extended or adjusted under 35 U.S.C. 154(b) by 345 days.

(21) Appl. No.: 15/434,154

(22) Filed: Feb. 16, 2017

(65) Prior Publication Data

US 2017/0183174 A1    Jun. 29, 2017

Related U.S. Application Data

(63) Continuation of application No. 14/742,918, filed on Jun. 18, 2015, now Pat. No. 9,611,109.

(60) Provisional application No. 62/014,387, filed on Jun. 19, 2014.

(51) Int. Cl.
*B60S 9/02* (2006.01)
*B65G 69/00* (2006.01)

(52) U.S. Cl.
CPC .................. *B65G 69/006* (2013.01)

(58) Field of Classification Search
CPC .......... B66F 7/065; B66F 7/0675; B66F 7/12; B65G 69/006
See application file for complete search history.

(56) References Cited

U.S. PATENT DOCUMENTS

| 9,611,109 B2 * | 4/2017 | Kimener | B65G 69/006 |
| 2016/0039622 A1 * | 2/2016 | Kimener | B65G 69/006 414/800 |
| 2017/0183174 A1 * | 6/2017 | Kimener | B65G 69/006 |

* cited by examiner

*Primary Examiner* — Lee D Wilson
(74) *Attorney, Agent, or Firm* — Dorton & Willis, LLP; Ryan Willis (57) ABSTRACT

A method of leveling a parked semi-trailer at a loading dock, the method comprising: (a) positioning a portable stabilizing device at least partially underneath a forward portion of the parked semi-trailer; (b) positioning a lift associated with the portable stabilizing device to bear weight of the forward portion of the parked semi-trailer; (c) reorienting the parked semi-trailer so a floor of the parked semi-trailer goes from a substantially parallel orientation to an approximately non-parallel orientation with respect to a horizontal floor of the loading dock by repositioning at least one of the jack and a landing gear of the parked semi-trailer; and, (e) maintaining the lift in a weight bearing position while goods are at least one of unloaded from or loaded onto the parked semi-trailer.

23 Claims, 9 Drawing Sheets

TRAILER STABILIZER AND LEVELER

CROSS REFERENCE TO RELATED APPLICATIONS

The present application claims the benefit of U.S. Provisional Patent Application Ser. No. 62/014,387, titled, "TRAILER STABILIZER AND LEVELER," filed Jun. 19, 2014, and U.S. Nonprovisional patent application Ser. No. 14/742,918, titled, "TRAILER STABILIZER AND LEVELER," filed Jun. 18, 2015, now U.S. Pat. No. 9,611,109, the disclosures of which are incorporated herein by reference.

RELATED ART

Field of the Invention

The present disclosure is directed to leveling and/or stabilizing devices that engage a parked freight trailer at a loading dock or similar location, as well as associated methods of stabilizing and/or leveling a parked freight trailer.

INTRODUCTION TO THE INVENTION

It is a first aspect of the present invention to provide a leveling and stabilizing device comprising a wheeled frame having mounted thereto a jack assembly, the jack assembly repositionable between an extended position and a retracted position, and at least one of a spirit level and an inclinometer operatively coupled to the jack assembly.

In a more detailed embodiment of the first aspect, the device further includes a controller operatively coupled to the jack assembly, wherein the leveling and stabilizing device includes an inclinometer operatively coupled to the jack assembly and the inclinometer is communicatively coupled to the inclinometer. In yet another more detailed embodiment, the controller is communicatively coupled to an actuator associated with the jack assembly, the controller configured to automatically control repositioning of a hydraulic cylinder of the jack assembly. In a further detailed embodiment, the wheeled frame includes a gooseneck. In still a further detailed embodiment, the jack assembly comprises a plurality of jack assemblies. In a more detailed embodiment, the wheeled frame includes a repositionable user handle. In a more detailed embodiment, the jack assembly is operatively coupled to a fifth wheel. In yet another more detailed embodiment, at least one of the spirit level and the inclinometer is mounted to a top plate of the fifth wheel.

It is a second aspect of the present invention to provide a method of leveling a parked freight trailer at a loading dock, the method comprising: (a) positioning a portable stabilizing device at least partially underneath a forward portion of the parked freight trailer; (b) positioning a lift associated with the portable stabilizing device to bear weight of the forward portion of the parked freight trailer; (c) reorienting the parked freight trailer so a floor of the parked freight trailer goes from a substantially non-parallel orientation to an approximately parallel orientation with respect to a floor of the loading dock by repositioning at least one of the jack and a landing gear of the parked freight trailer; and, (d) maintaining the lift in a weight bearing position while goods are at least one of unloaded from or loaded onto the parked freight trailer.

In a more detailed embodiment of the second aspect, the act of reorienting the parked freight trailer includes repositioning the landing gear of the parked freight trailer so the jack associated with the portable stabilizing device to bears all the weight of the forward portion of the parked freight trailer. In yet another more detailed embodiment, the act of reorienting the parked freight trailer includes repositioning the landing gear of the parked freight trailer and repositioning of the jack so the jack and the landing gear bears all the weight of the forward portion of the parked freight trailer. In a further detailed embodiment, the act of reorienting the parked freight trailer includes repositioning of the jack so the jack bears all the weight of the forward portion of the parked freight trailer. In still a further detailed embodiment, the act of reorienting the parked freight trailer includes repositioning the landing gear of the parked freight trailer so the jack associated with the portable stabilizing device to bears at least some of the weight of the forward portion of the parked freight trailer. In a more detailed embodiment, the act of reorienting the parked freight trailer includes: (i) repositioning the jack so the jack bears at least some of the weight of the forward portion of the parked freight trailer; (ii) repositioning the landing gear to discontinue contact with the ground so that the jack bears all of the weight of the forward portion of the parked freight trailer; and, (iii) repositioning the jack while the jack bears all of the weight of the forward portion of the parked freight trailer.

In yet another more detailed embodiment of the second aspect, the method further includes repositioning a tailhold, operatively coupled to the jack, between a raised position and an engaged position, where the engaged position couples the tailhold to the ground and the raised position does not directly couple the tailhold to the ground. In yet another more detailed embodiment, the method further includes disengaging a transport vehicle from underneath of the forward portion of the parked freight trailer prior to positioning the portable stabilizing device underneath the forward portion of the parked freight trailer, proximate a king pin. In a further detailed embodiment, the floor of the parked freight trailer is substantially non-parallel to the floor of the loading dock immediately following the transport vehicle being disengaged from the forward portion of the parked freight trailer. In still a further detailed embodiment, the method further includes actively monitoring changes in orientation of the parked freight trailer using at least one of visual feedback from a spirit level or electronic feedback from an inclinometer. In a more detailed embodiment, the act of positioning the lift includes positioning the lift to engage at least one of a king pin and a pin box of the parked freight trailer.

It is a third aspect of the present invention to provide a method of leveling a parked freight trailer, the method comprising: (a) activating a jack, configured to selectively operatively engage an underside of a parked freight trailer and the ground, to operatively engage the underside of the parked freight trailer and the ground while landing gear of the parked freight trailer are in contact with the ground, wherein when the jack operatively engages the underside of the parked freight trailer, a floor of the parked freight trailer is at a first angle with respect to a horizontal level plane; and, (b) activating the jack, while operatively engaging the underside of the parked freight trailer and the ground, to change a distance between the underside of the parked freight trailer and the ground to reach an egress height, wherein the egress height includes the floor of the freight trailer having a second angle with respect to the horizontal level plane, where the second angle is less than is the first angle.

In a more detailed embodiment of the third aspect, the method further includes raising the landing gear of the parked freight trailer after the jack operatively engages the underside of the parked freight trailer and before the parked freight trailer reaches the egress height. In yet another more detailed embodiment, the method further includes lowering the landing gear of the parked freight trailer after the parked freight trailer reaches the egress height. In a further detailed embodiment, the act of lowering the landing gear includes having the landing gear contact the ground, and the act of activating the jack to change the distance includes maintaining the operative engagement between the jack and ground. In still a further detailed embodiment, the act of activating the jack to operatively engage the underside of the parked freight trailer and the ground includes continuing engagement between a landing gear of the parked freight trailer and the ground. In a more detailed embodiment, the method further includes at least one of loading and unloading the parked freight trailer after reaching the egress height. In a more detailed embodiment, the method further includes repositioning a tailhook, operatively coupled to the jack, between a raised position and an engaged position, where the engaged position couples the tailhook to the ground and the raised position does not directly couple the tailhook to the ground.

In yet another more detailed embodiment of the third aspect, the act of activating the jack to operatively engage the underside of the parked freight trailer and the ground includes utilization of an electronic controller to govern activation of the jack, and the act of activating the jack to change a distance between the underside of the parked freight trailer and the ground includes utilization of the electronic controller to govern activation of the jack. In yet another more detailed embodiment, the act of utilizing the electronic controller to govern activation of the jack to change the distance between the underside of the parked freight trailer and the ground includes the controller receiving a signal from a sensor associated with at least one of the parked freight trailer and the jack, and the signal provides information about the changes in position of at least one of the parked freight trailer and the jack indicative of an angle of the floor of the parked freight trailer with respect to the horizontal level plane. In a further detailed embodiment, the method further includes repositioning the jack underneath a forward portion of the parked freight trailer while the landing gear of the parked freight trailer engages the ground, wherein the position of the landing gear with respect to the ground coincides with the floor of the parked freight trailer and the ground being approximately parallel to one another. In still a further detailed embodiment, the act of activating the jack to change the distance between the underside of the parked freight trailer and the ground coincides with the floor of the parked freight trailer and the ground being angled greater than ten degrees with respect to one another. In a more detailed embodiment, the method further includes operatively coupling the jack to a ground mount fixedly attached to the ground repositioning a tailhook operatively coupled to the jack between a raised position and an engaged position, where the engaged position couples the tailhook to the ground and the raised position does not directly couple the tailhook to the ground.

DETAILED DESCRIPTION

The exemplary embodiments of the present disclosure are described and illustrated below to encompass devices and methods that may be used to stabilize and/or level a parked freight trailer. Of course, it will be apparent to those of ordinary skill in the art that the embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

Figure 1:
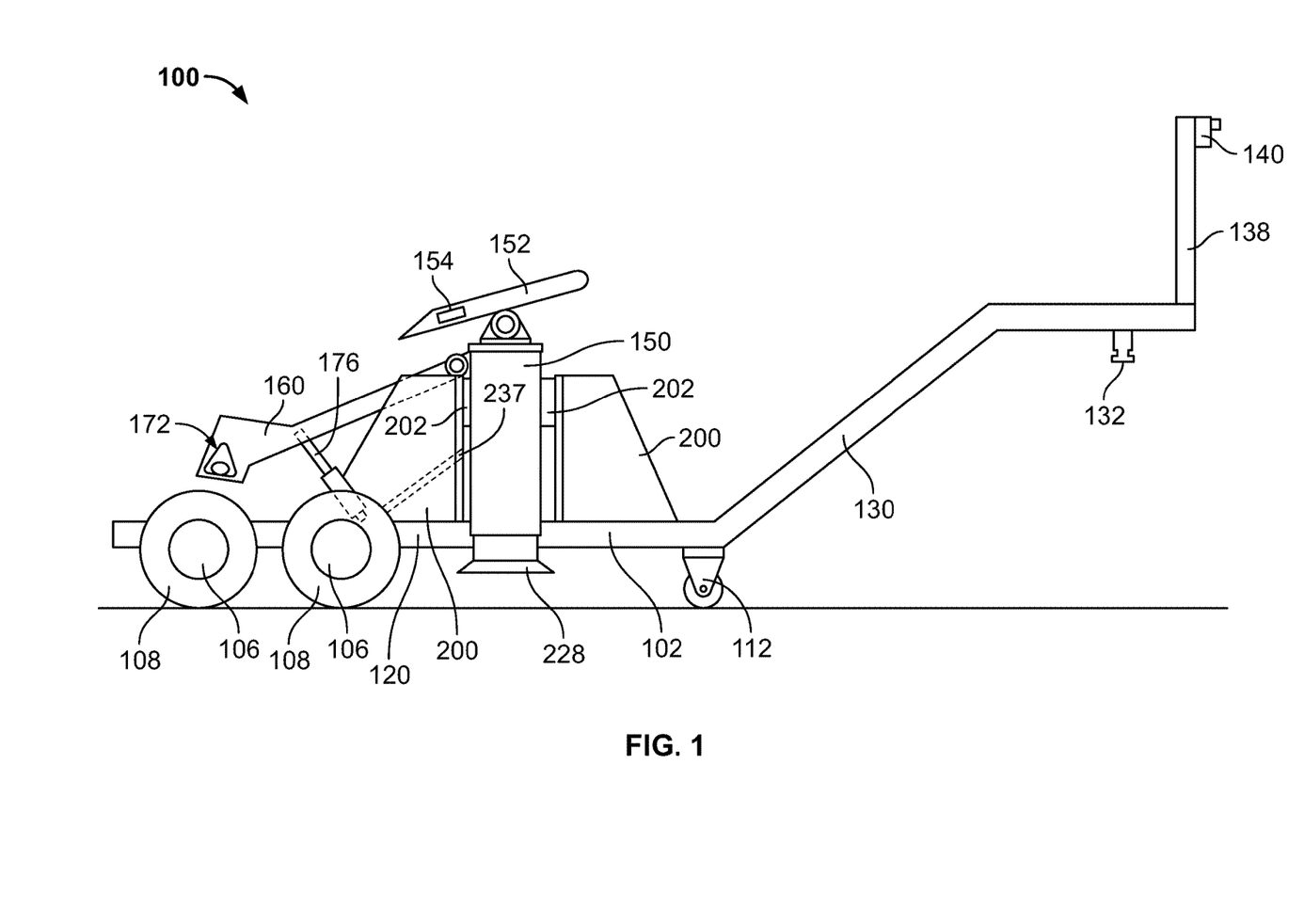
FIG. 1 is a side profile view of a first exemplary embodiment in accordance with the present disclosure.
Figure 2:
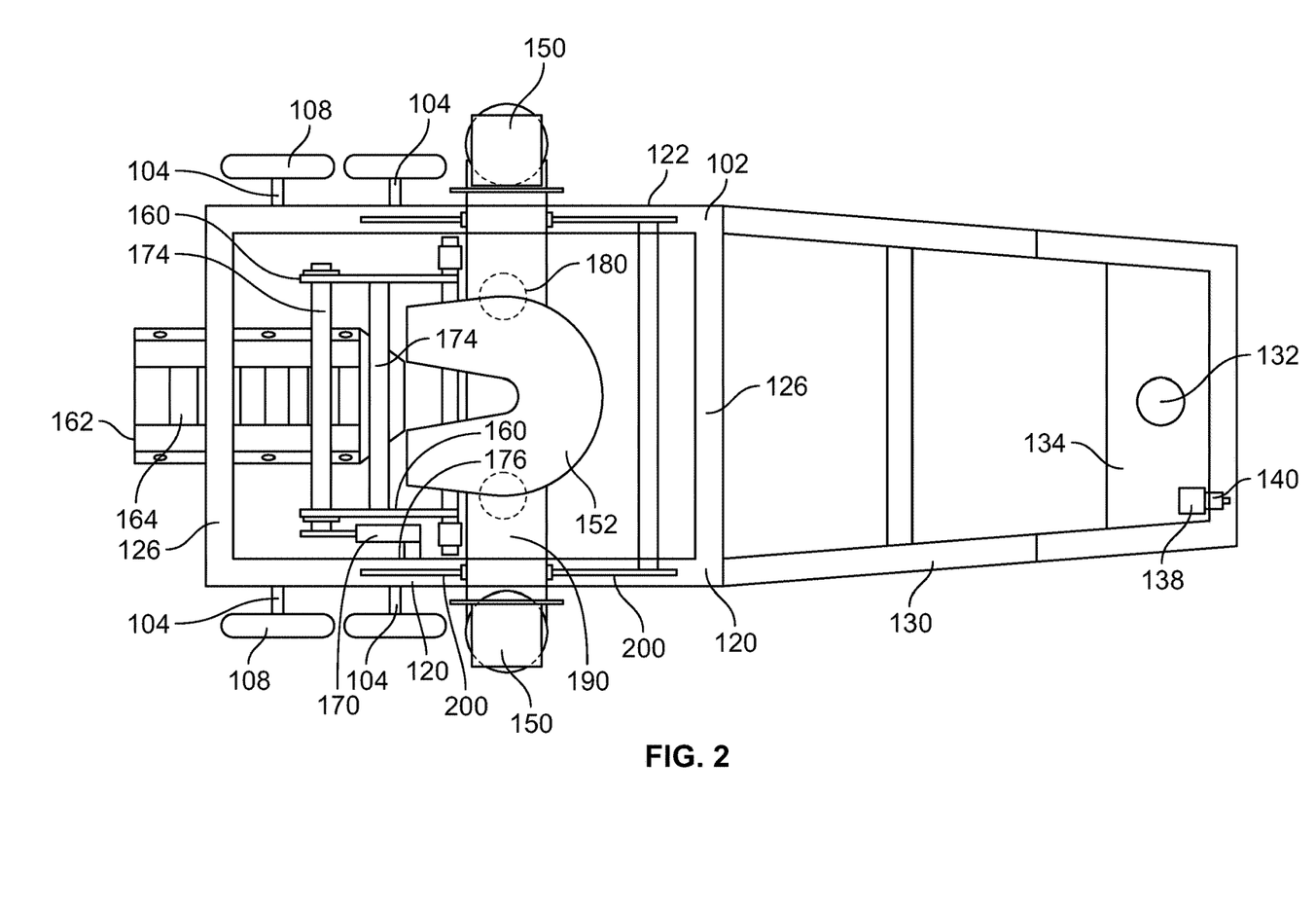
FIG. 2 is a top view of the first exemplary embodiment of FIG. 1.
Figure 3:
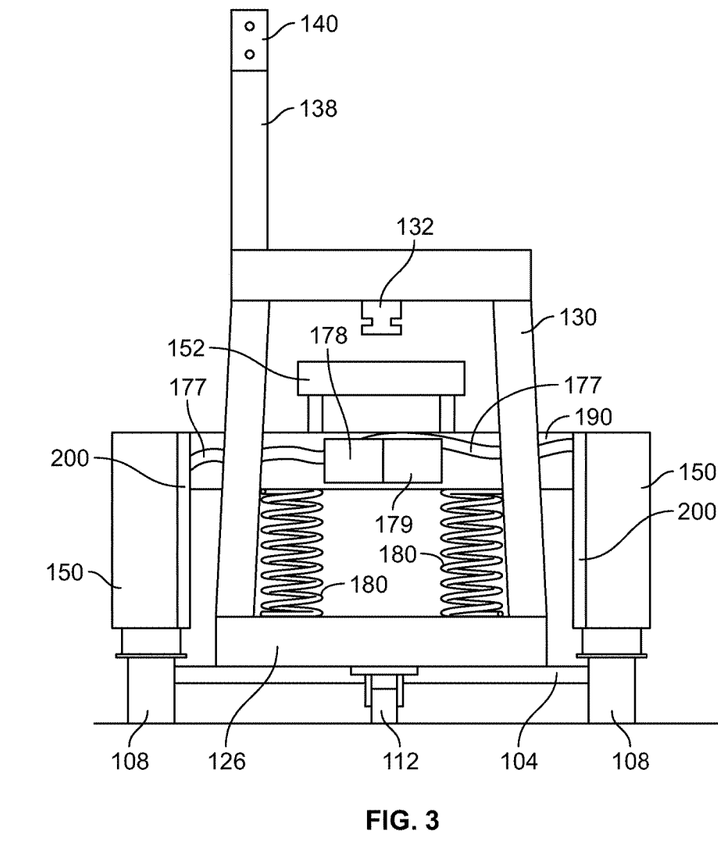
FIG. 3 is a frontal profile view of the first exemplary embodiment of FIG. 1.
Figure 4:
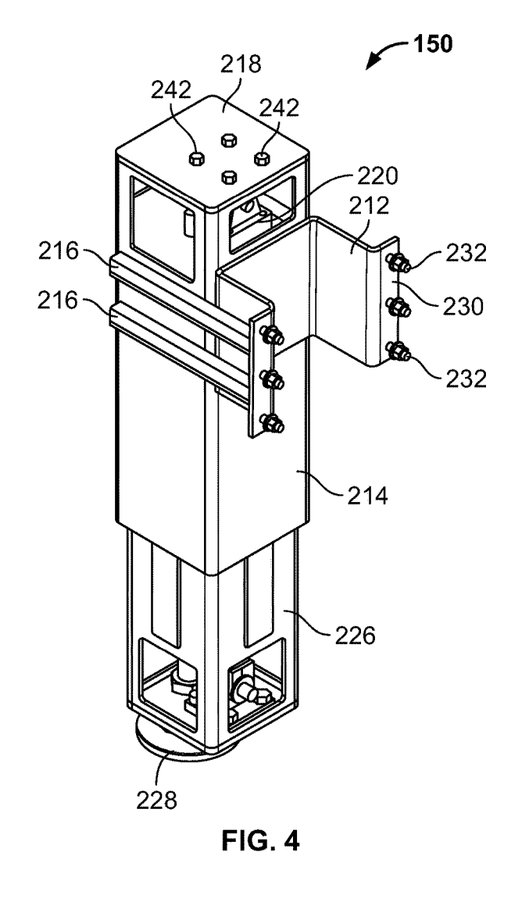
FIG. 4 is an elevated perspective view of one of the two jack assemblies included as part of the first exemplary embodiment.
Figure 5:
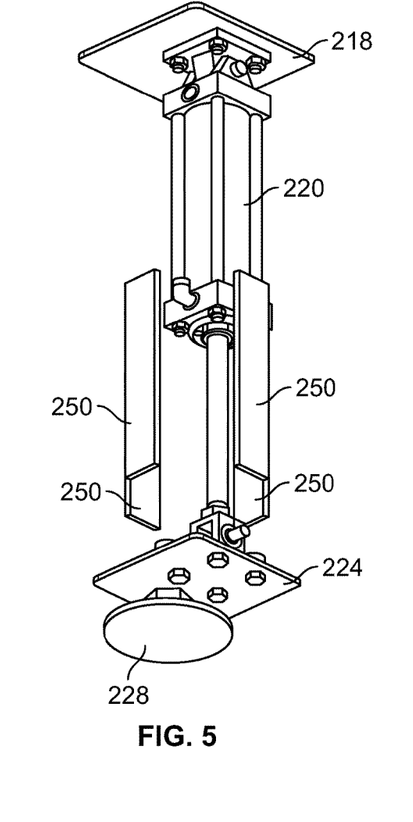
FIG. 5 is an elevated perspective view of the jack assembly of FIG. 4, without the upper and lower cylinder housing assemblies, but for the top and bottom plates.
Figure 6:
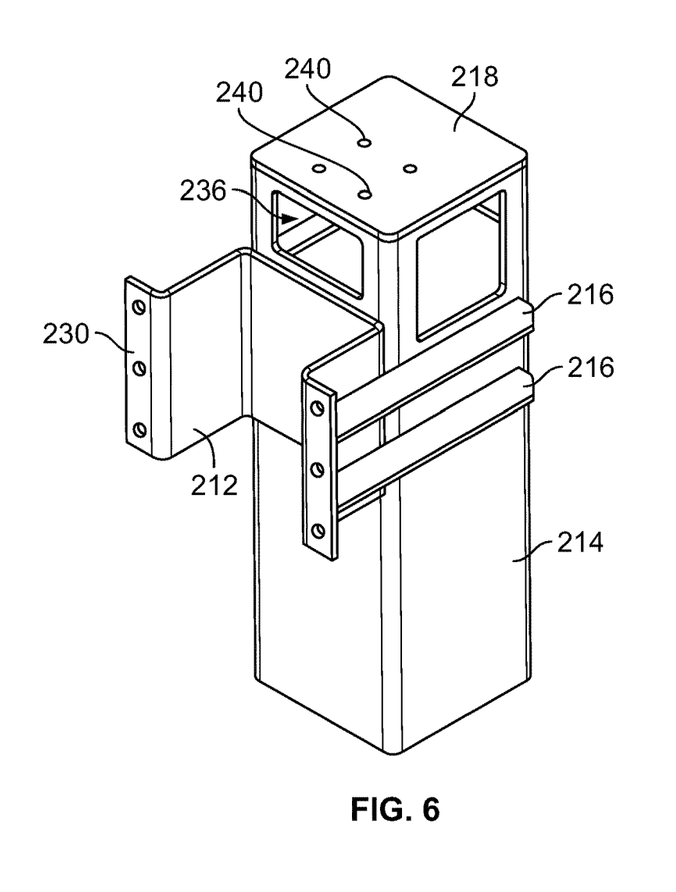
FIG. 6 is an elevated perspective view of the upper cylinder housing assembly.
Figure 7:
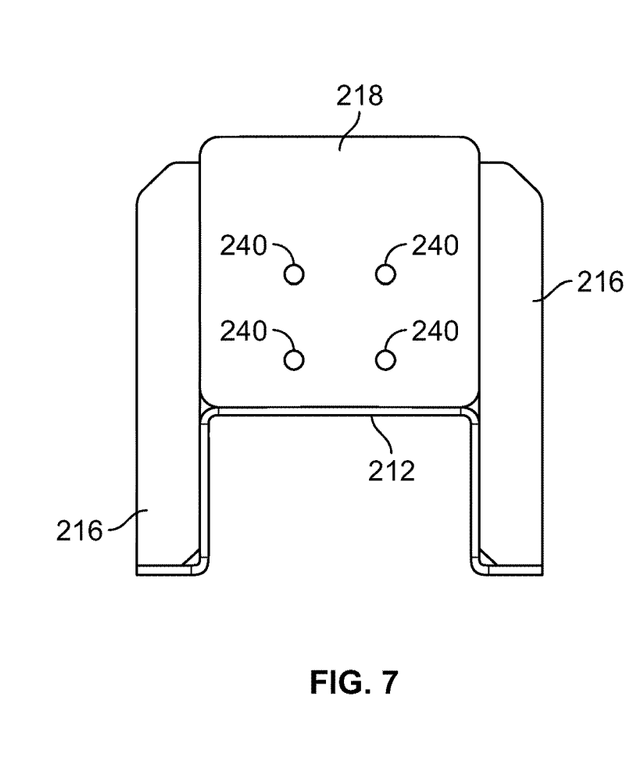
FIG. 7 is a top view of the upper cylinder housing assembly of FIG. 6.

Referencing FIGS. 1-3, an exemplary stabilizing and leveling device 100 includes a portable frame 102 that is repositionable using a pair of axles 104 mounted to the frame, where each axle includes low profile wheels 106 and tires 108 mounted to opposing ends. It should be understood, however, that one or more axles 104 may be mounted to the frame 102. Likewise, it is not required that the wheels 106 and tires 108 be low profile. In addition to the axles 104, the frame 102 has mounted thereto one or more casters 112 that readily allow manual repositioning (e.g., swiveling, pivoting, etc.) of the device 100 when the device is not mounted to another vehicle or parked freight trailer.

In exemplary form, the frame 102 includes a pair of frame rails 120, 122 extending generally parallel to one another and extending along a longitudinal length of the device 100. Interconnecting the frame rails 120, 122 are a plurality of cross-members 126. A forward most cross-member 126 is mounted to a gooseneck 130 that includes a king pin 132 extending vertically from a hitch plate 134. In this exemplary embodiment, the gooseneck 130 and king pin 132 are adapted to mount to a yard truck or similar vehicle. But it should be understood, however, that the dimensions of the gooseneck 130 and king pin 132 may be varied to adapt these structures to mount to other vehicles. For instance, the gooseneck 130 may have a lesser height to accommodate coupling to a hitch mounted to a utility vehicle such as, without limitation, a John Deere Gator, a Kawasaki Teryx, a Polaris RZR, a Honda Mule, a Yamaha Rhino, or other similar vehicle. In this manner, the exemplary device 100 may be repositioned and operated using a vehicle other than a dedicated yard truck. Conversely, the gooseneck 130 may be omitted and/or replaced with a handle (not shown) to allow for easier manual repositioning of the exemplary stabilizing and leveling device 100.

Vertically upstanding from the hitch plate 134 and mounted thereto is a control arm 138, which has mounted thereto a controller 140. As will be discussed in more detail hereafter, the controller 140 provides manual controls for operating features of the device 100, in addition to a visual display providing visual feedback to an operator concerning operation of the device.

In order to provide a stabilizing feature, the device 100 includes a pair of jack assemblies 150 that are repositionably mounted to the frame 102 and operatively coupled to a conventional fifth wheel 152 that is adapted to engage and lock the king pin of a freight trailer (or other king pin receiver that need not lock the king pin in place). Those skilled in the art are familiar with fifth wheels 152 utilized to couple a vehicle to a freight trailer. Accordingly, a more detailed discussion of the fifth wheel 152 has been omitted in furtherance of brevity. In exemplary form, the fifth wheel 152 (specifically the top plate of the fifth wheel) includes a level sensor or level gauge 154 (e.g., an inclinometer, a spirit level, etc.) that provides visual feedback and/or communicates directly with the controller 140 and/or provides information to the user about the position of the fifth wheel top plate with respect to horizontal level. As will be discussed in more detail hereafter, this sensor/gauge 154 may be used for informative purposes in order to discern when to no longer reposition the jack assemblies 150 if the fifth wheel top plate is level, presuming the top plate is parallel with the king pin plate, which is parallel with the floor of freight trailer.

A tail hook assembly 160 is pivotally mounted to one of the cross-members 126 and is adapted to be repositioned between an engaged position and a disengaged position. In the engaged position, a portion of the tail hook assembly 160 is lowered to engage a lock box 162 or other ground mounted device in order to mount the device 100 to the ground and retard forward movement of the device away from the lock box. In exemplary form, the lock box 162 comprises a series of laterally oriented and spaced apart (proximal to distal) grooves 164 sized to accommodate insertion of a portion of the tail hook assembly 160. When a portion of the tail hook assembly 160 is received within one of the grooves 164, any forward motion of the device 100 is resisted by the tail hook assembly 160 contacting the boundaries of the lock box 162 groove 164 in question and attempting to move the portion of the tail hook assembly forward, but no significant forward motion is allowed because of resistance from the lock box. Given that the forward position (proximal to distal) position of the device 100 may vary given varying lengths of freight trailers, the grooves 164 are spaced apart so that various forward positions of the device may be accommodated.

In exemplary form, the tail hook assembly 160 comprises an H-shaped frame 170 that consists of a pair of parallel supports interconnected by a cross-support. Each parallel support includes a rounded triangular opening 172 at its distal end that accommodates through put of a capture bar 174, which is captured by at least one groove 164 of the lock box 162 when in the engaged position. The size of the opening 172 is larger than the cross-section of the capture bar 174, thereby allowing the capture bar to move within the boundaries of the opening. In this manner, the opening 172 accommodates for more minute deviations in the alignment between the lock box groove 164 and the capture bar. In other words, the opening 172 allows the capture bar 174 to move forward or backward (proximal to distal) within a predefined range to precisely align with and be received by a corresponding groove 164 of the lock box 162.

In order to reposition the tail hook assembly 160 between an engaged position and a disengaged position (where the capture bar 174 is not received by at least one of the grooves 164 of the lock box 162), a hydraulic cylinder 176 is concurrently mounted to the tail hook assembly 160 and the frame 102. Corresponding hydraulic lines are run along at least one of the frame rails 120, 122 and along the gooseneck 130 to terminate in hydraulic connectors proximate the forward end of the gooseneck. These hydraulic connectors are adapted to engage corresponding hydraulic connectors of a tow vehicle or an on-board pump 178 powered electrically from an on-board power supply 179 (e.g., a generator, a battery, etc.) or an electric cable from the tow vehicle to provide a hydraulic source of power to the hydraulic cylinder 176 in order to selectively reposition the tail hook assembly 160 between an engaged position and a disengaged position. The tail hook assembly is repositioned from the disengaged position to the engaged position when the device is repositioned underneath a parked freight trailer and the fifthwheel 152 has engaged the parked freight trailer king pin.

In this exemplary embodiment, the fifth wheel 152 and jack assemblies 150 are mounted to the frame 102 to float. More specifically, a cross-member 126 of the frame 102 includes spring mounts (limited height cylinders having smaller diameter than the coil springs) that receive a corresponding pair of coil springs 180. Opposite the frame spring mounts are carriage spring mounts that are part of a carriage assembly 190. In exemplary form, the carriage assembly 190 is spring biased with respect to and moves vertically with respect to the frame 102 along guides 200 that are mounted to the frame. The carriage assembly 190 includes a cross-member mounted to each of the jack assemblies 150 and concurrently mounted to the fifth wheel 152. In addition, the carriage assembly 190 includes corresponding slides 202 that receive a portion of the guides 200 therein to provide movement of the carriage assembly (and the jack assemblies 150 and fifth wheel 152) along a predetermined linear path.

Referring to FIGS. 4-9, each jack assembly 150 includes a mounting plate 212 that is concurrently mounted to an upper housing 214 and gussets 216. Also mounted to the upper housing 214 is a top plate 218, which is concurrently mounted to a hydraulic cylinder 220. The hydraulic cylinder 220 is concurrently mounted to a bottom plate 224, which is mounted to a lower housing 226. The bottom of the bottom plate 224 includes a foot 228 that is adapted to engage the ground when the jack assembly is fully extended.

In exemplary form, the mounting plate 212 comprises a block U-shaped bracket having corresponding flanges 230 at its ends that accommodate threaded fasteners 232 in order to mount the mounting plate to the cross-member of the carriage assembly 190. By way of example, the mounting plate 212 is welded to an exterior wall of the upper housing 214 just below one of a series of peripheral openings 236. The peripheral openings 236 provide access to the interior of the housing 214 in order to accommodate hydraulic lines (not shown) in fluid communication with the hydraulic cylinder 220. In this exemplary embodiment, the housing 220 has a hollow rectangular horizontal cross-section and allows for concurrent mounting of opposed pairs of gussets 216 to reinforce the flanges 230. By way of example, the gussets 216 are welded to opposite exterior walls of the upper housing 214 and to the rear of the flanges 230. Also welded to the top of the upper housing 214, to close off an otherwise rectangular opening, is the top plate 218. This top plate 218 also includes a series of orifices 240 that accommodate through put of threaded fasteners 242 in order to removably mount the hydraulic cylinder 220 thereto. This allows a fixed mounting point so that movement (extension or contraction) of the hydraulic cylinder results in vertical movement of the upper housing 214 with respect to the lower housing 226.

Figure 8:
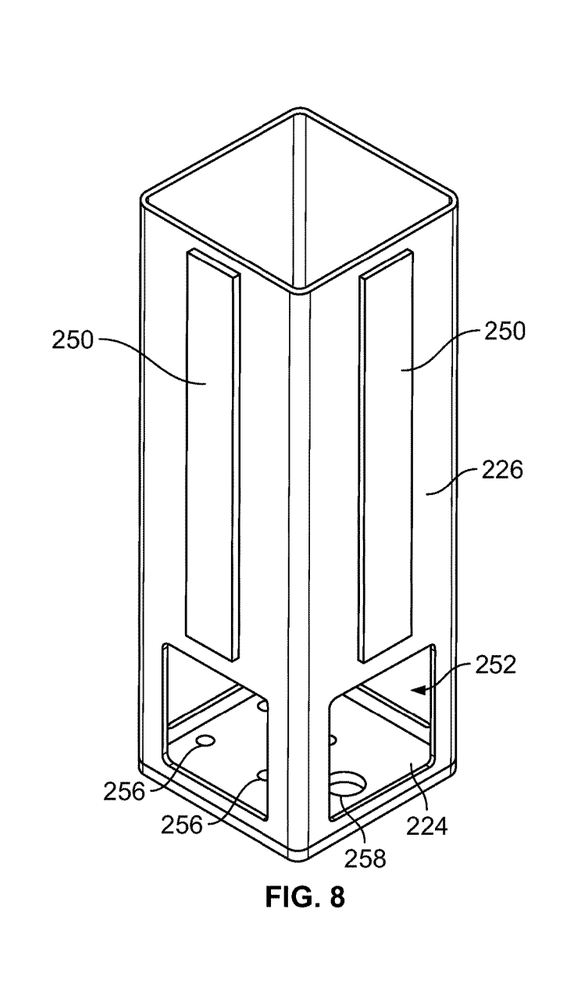
FIG. 8 is an elevated perspective view of the lower cylinder housing assembly.
Figure 9:
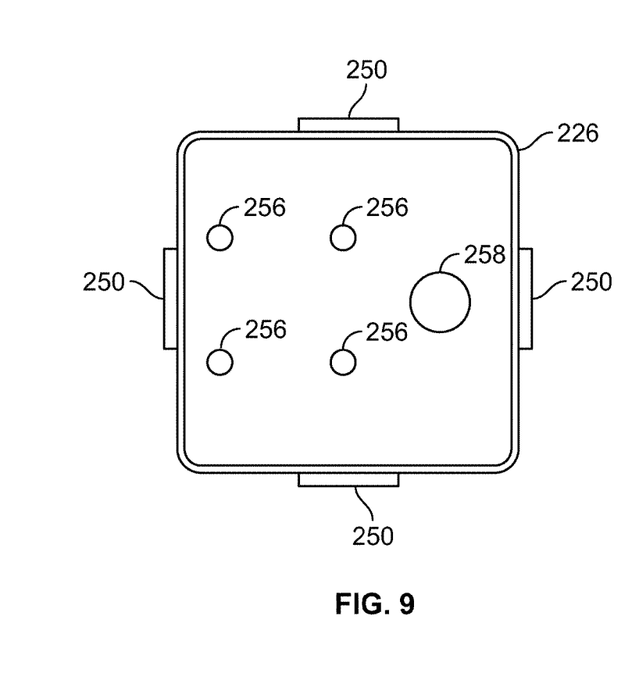
FIG. 9 is a bottom view of the lower cylinder housing assembly of FIG. 8.

Referring specifically to FIGS. 8 and 9, the lower housing 226 also has a hollow rectangular horizontal cross-section, but its cross-section is slightly smaller than that of the upper housing 214. In particular, the lower housing 226 includes a number of side plates 250 mounted to each of the four exterior walls in order to increase the cross-section footprint to fit more snuggly within the interior of the upper housing 214. In this manner, the lower housing 226 slides within the upper housing 214 to increase or decrease the vertical height of the jack assembly 150. The lower housing 226 also includes a plurality of openings 252 formed through the exterior walls to provide access to the interior of the lower housing. By way of example, one or more of these openings 252 may provide egress for one or more hydraulic hoses (not shown) coupling to the hydraulic cylinder 220. The bottom plate 224 is welded to the bottom of the lower housing 226 to close off an otherwise rectangular opening. The bottom plate 224 includes a series of though holes 256 that accommodate threaded fasteners used to removably mount the hydraulic cylinder 220 to the bottom plate. In addition, the bottom plate also include a through hole 258 to accommodate throughput of a portion of the foot in order to mount the foot to the plate.

Referring back to FIGS. 1-3, 9, and 10, the exemplary device 100 may be used to stabilize and level a parked freight trailer 300. For purposes of explanation only, the following sequence will be described where the device 100 is used to stabilize and level a freight trailer 300 parked at a declined ramp 302 of a loading dock 310. But those skilled in the art should understand that the device need not be used to level the parked freight trailer and may be used with trailers parked at inclined ramps and level ramps.

Figure 10:
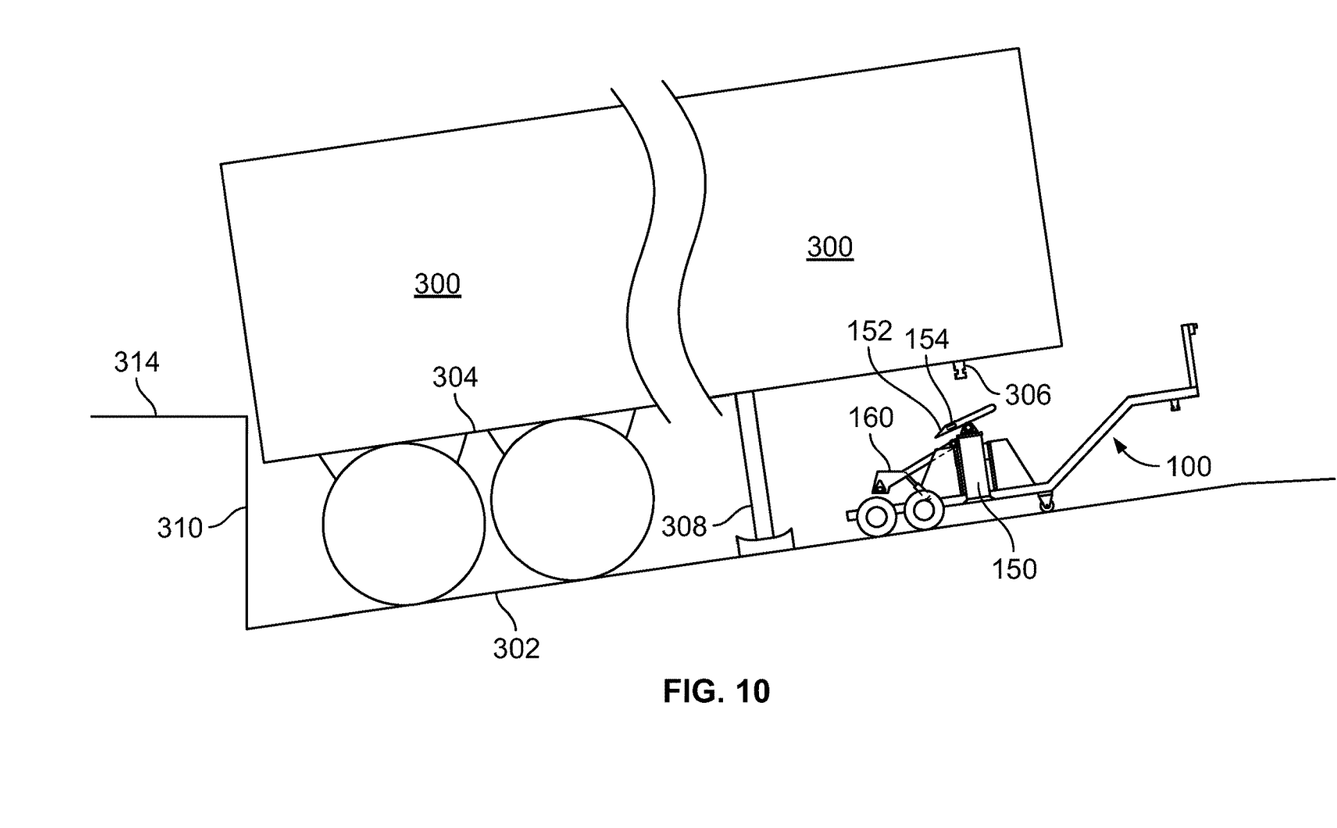
FIG. 10 is a profile view of a freight trailer parked on a declined ramp of a loading dock prior to mounting the first exemplary embodiment to the parked freight trailer.

As an initial starting point, the freight trailer 300 has been backed up to an opening of the loading dock 310 so that the front of the trailer, proximate the location of a king pin 306, is farthest away from the loading dock. This exemplary loading dock includes a declined ramp 302, which means the floor 304 of the freight trailer 300 is not level with the floor 314 of the loading dock when the freight trailer is parked adjacent the loading dock and disengaged from a truck (e.g., an over-the-road truck or a yard truck). This circumstance creates problems for loading and unloading contents from the freight trailer. While one may use a dock leveler, the dock leveler does not level the freight trailer, but rather provides an incline transition between the floor of the freight trailer and the floor of the loading dock. Consequently, items on wheels or rollers within the freight trailer may have a tendency to roll out of the trailer and into the floor of the loading dock, which may lead to personal injury and damage of the goods coming out of the freight trailer. In order to stabilize and level the freight trailer, one may use the exemplary device 100 as follows.

The exemplary device 100, after an over-the-road truck or a yard truck has disengaged from the parked freight trailer 300, is positioned underneath the freight trailer 300 either manually or by using a vehicle (not shown) attached to the device that may provide one or more of electrical power, pneumatic power, and hydraulic power. More specifically, the device 100 is positioned so that the tail hook assembly 160 is nearer the loading dock 310 that is the front of the device 100 (e.g., where the gooseneck 130 may extend) and so that the fifth wheel 152 is generally aligned with the king pin 306 of the freight trailer as shown in FIG. 10. At the same time, the jack assemblies 150 are in a retracted position or in an otherwise travel position so as not to complicate repositioning of the device 100. Thereafter, an operator manually deploys the tail hook assembly 160 or utilizes the controller 140 to do so automatically. Regardless of which approach is used to deploy the tail hook assembly 160, the hydraulic cylinder 176 may be retracted to cause the H-shaped frame 170 to pivot with respect to the device frame 102 and reposition the capture bar 174 vertically toward the ground until the capture bar becomes located (and preferably lodged) within one of the grooves 164 of the lock box 162, which is mounted to the declined ramp 302. After the capture bar 174 is captured within one of the grooves 164, the hydraulic cylinder 176 is deactivated and gravity and/or hydraulic pressure maintains the position of the capture bar with respect to the lock box 162.

Figure 11:
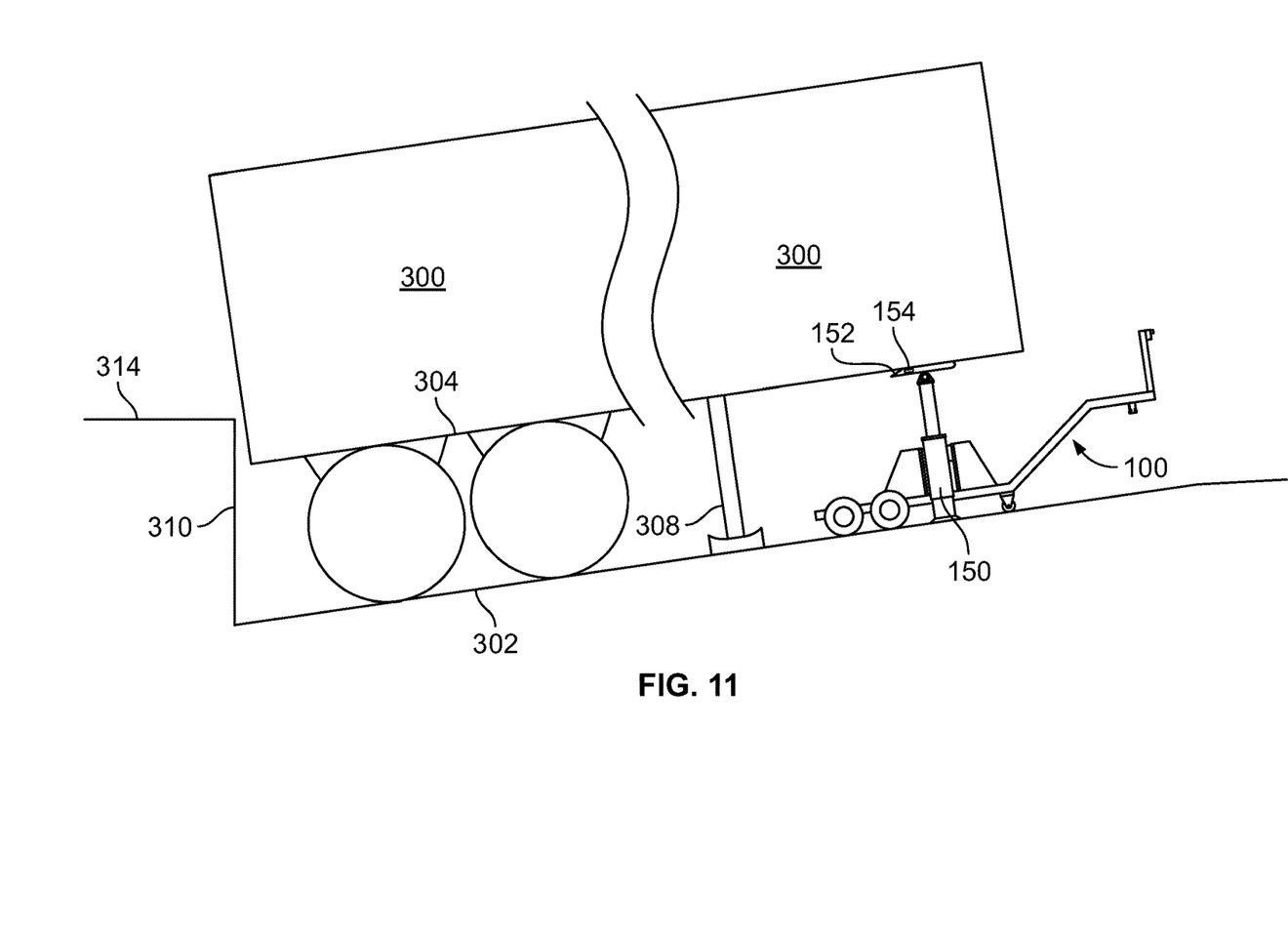
FIG. 11 is a profile view of a freight trailer parked on a declined ramp of a loading dock subsequent to mounting the first exemplary embodiment to the parked freight trailer.

At the same time, thereafter, or before, the operator manually actuates the jack assemblies 150 or utilizes the controller 140 to do so automatically. In exemplary form, the jack assemblies 150 are vertically extended to cause the fifth wheel 152 to rise and engage at least one of the freight trailer king pin 306 and the pin box, while the feet 228 are lowered to contact the ground (i.e., the declined ramp 302). In exemplary form, the jack assemblies 150 may be repositioned to bear all or a portion of the forward weight of the parked freight trailer 300. In either event, after the jack assemblies 150 are repositioned to at least bear a portion of the forward weight of the parked freight trailer 300 (see FIG. 11), the trailer's landing gear 308 are repositioned (e.g., retracted). The landing gear 308 is then retracted so that the jack assemblies 150 bear all of the forward weight of the parked freight trailer 300. After the jack assemblies 150 bear all of the forward weight of the parked freight trailer 300, the jack assemblies may be vertically repositioned, thereby causing the front of the freight trailer to move vertically downward toward the declined ramp 302 (see FIG. 12). Depending upon the amount of incline/decline of the ramp 302, the jack assemblies 150 may be greater or lesser repositioned, but in any event repositioned to cause the floor 304 of the freight trailer 300 to be approximately level with the floor 314 of the loading dock. More specifically, when manually repositioning the jack assemblies 150, the user may read or visualize the level sensor or level gauge 154 and stop repositioning of the jack assemblies when the level sensor/gauge indicates the top plate of the fifth wheel 152 is or approximates level. Alternatively, when using the controller 140 to automatically reposition the jack assemblies 150, communication with the level sensor/gauge 154 provides feedback to the controller indicating when to discontinue repositioning of the jack assemblies when the sensor/gauge indicates a level condition or a near level condition, which corresponds with a floor of the freight trailer being level or near level. After repositioning the jack assemblies 150 so that the floor of the freight trailer 300 is level or near level, the freight trailer 300 may be loaded or unloaded. And the device 300 remains in place to stabilize and bear the forward weight of the freight trailer while the trailer is loaded/unloaded.

An exemplary alternate method of using the instant device 100 to stabilize and restrain a parked freight trailer 300 includes manual or vehicular positioning the device underneath the freight trailer after an over-the-road truck or a yard truck has disengaged from the parked freight trailer. More specifically, the device 100 is positioned so that the tail hook assembly 160 is nearer the loading dock 310 that is the front of the device 100 (e.g., where the gooseneck 130 may extend) and so that the fifth wheel 152 is generally aligned with the king pin 306 of the freight trailer as shown in FIG. 10. At the same time, the jack assemblies 150 are in a retracted position or in an otherwise travel position so as not to complicate repositioning of the device 100. Thereafter, an operator may manually deploy the tail hook assembly 160 or utilize the controller 140 to do so automatically. Regardless of which approach is used to deploy the tail hook assembly 160, the hydraulic cylinder 176 may be retracted to cause the H-shaped frame 170 to pivot with respect to the device frame 102 and reposition the capture bar 174 vertically toward the ground until the capture bar becomes located (and preferably lodged) within one of the grooves 164 of the lock box 162, which is mounted to the declined ramp 302. After the capture bar 174 is captured within one of the grooves 164, the hydraulic cylinder 176 is deactivated and gravity and/or hydraulic pressure maintains the position of the capture bar with respect to the lock box 162.

At the same time, thereafter, or before, the operator manually lowers the landing gear 308 of the parked freight trailer 300. By manually lowering the landing gear 308, the landing gear continues to bear all of the forward weight of the parked freight trailer 300, but operates to cause the front of the freight trailer to move vertically downward toward the declined ramp 302 (see FIG. 12). Eventual retraction of the landing gear 308 causes king pin or pin box of the parked freight trailer 300 to engage the fifth wheel 152. Prior to or after engagement between the fifth wheel 152 and king pin or pin box, the jack assemblies 150 may be repositioned to contact the ground (i.e., the declined ramp 302). In exemplary form, the jack assemblies 150 may be repositioned to bear none, all or a portion of the forward weight of the parked freight trailer 300. By way of example, it is envisioned that the landing gear 308 bear the majority of the forward weight of the parked freight trailer 300, and the jack assemblies 150 are positioned so as to bear the entire forward weight of the parked freight trailer 300 should the landing gear fail. At this time, the freight trailer 300 may be loaded or unloaded. And the device 300 remains in place to potentially restrain and bear the forward weight of the freight trailer.

The instant device 100 may also be used to raise or lower the front of the freight trailer 300 after it has been loaded or unloaded. It has been noticed that landing gear 308 is not always operable (e.g., the load on the landing gear is too great to allow a human to crank the landing gear down or extend the landing gear) to increase or decrease the height of a forward portion of a fully loaded freight trailer. This can be the result of the landing gear being unable to be manually repositioned by a human and/or the landing gear being in disrepair. Regardless of the reason, the instant device 100 is operative to reposition the forward portion of a loaded or unloaded freight trailer in order to allow a yard truck or other freight trailer repositioning vehicle to reconnect to the freight trailer after it is loaded and/or unloaded.

Figure 12:
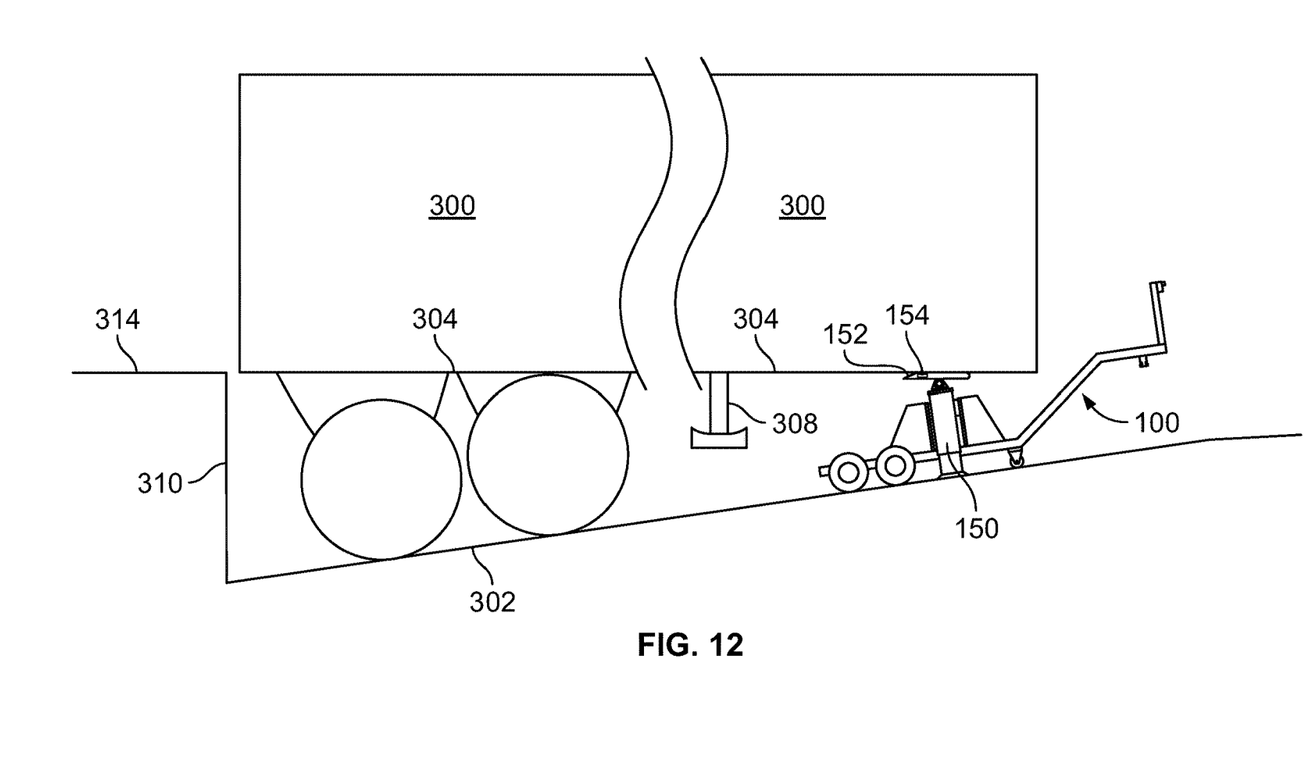
FIG. 12 is a profile view of the freight trailer of FIG. 11 parked on the declined ramp of the loading dock subsequent to lowering the jacks of the first exemplary embodiment to have the floor of the parked freight trailer at least roughly level to the floor of the loading dock.

In order to reposition the forward end of the freight trailer 300 and disengage the device 100 therefrom after having the freight trailer loaded or unloaded, it is presumed that the landing gear 308 is in a fully retracted position (see FIG. 12) and the tail hook assembly 160 is engaged with the ground. In the position, as shown in FIG. 12, an operator of the device 100 may manually actuate the jack assemblies 150 or utilize the controller 140 to do so automatically. In exemplary form, the jack assemblies 150 are repositioned to raise (or lower in the case of a freight trailer parked on an inclined ramp, the opposite of that shown in FIG. 12) the forward end of the freight trailer 300 while the fifth wheel 152 continues to engage the freight trailer king pin 306 and the feet 228 of the jack assemblies contact the ground (i.e., the declined ramp 302). Eventually, the jack assemblies 150 have been repositioned enough to achieve an elevated height of the forward portion of the freight trailer 300 approximating the engagement height necessary to allow a yard truck or other freight trailer repositioning vehicle to reconnect to the freight trailer in order to remove the freight trailer. When the requisite repositioning of the jack assemblies 150 has been completed, the landing gear 308 of the freight trailer 300 may be repositioned to contact the ground 302 and assume weight bearing responsibility of a forward portion of the freight trailer. This weight bearing responsibility of the landing gear 308 may be the result of repositioning the jack assemblies 150 and/or repositioning of the landing gear. In any event, after the landing gear 308 achieves weight bearing responsibility, the device 100 may be removed from underneath the forward portion of the freight trailer.

As a requisite to removal of the device 100, the fifth wheel 152 discontinues engagement with the freight trailer king pin 306, the tail hook assembly 160 is raised to discontinue engagement with the ground, and the jack assemblies 150 are repositioned to a transport position (see FIG. 10). In exemplary form, an operator manually actuates the tail hook assembly 160 or utilizes the controller 140 to do so automatically. More specifically, the hydraulic cylinder 176 is activated to cause the H-shaped frame 170 to pivot with respect to the device frame 102 and reposition the capture bar 174 out of engagement with a corresponding groove 164 of the lock box 162. When the tail hook assembly 160 has been raised, the fifth wheel 152 disengaged, and the jack assemblies 150 repositioned for transport, the device 100 may be removed from underneath the parked freight trailer 300.

The foregoing steps of the tail hook assembly 160 discontinuing engagement with the ground, discontinuing engagement between the fifth wheel 152 and the trailer king pin 306, and the jack assemblies 150 being repositioned for transport need not occur in any particular order and, in fact, may occur in any order. More specifically, it may be preferred to reposition the tail hook assembly 160 to discontinue engagement with the ground prior to repositioning the jack assemblies 150 and discontinuing engagement between the fifth wheel 152 and the freight trailer king pin 306. Alternatively, the tail hook assembly 160 may discontinue engagement with the ground subsequent to or contemporaneous with repositioning the jack assemblies 150 and discontinuing engagement between the fifth wheel 152 and the freight trailer king pin 306.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method of reorienting a parked semi-trailer at a loading dock, the method comprising:
    positioning a portable stabilizing device at least partially underneath a forward portion of the parked semi-trailer;
    positioning a lift associated with the portable stabilizing device in a weight bearing position to bear weight of the forward portion of the parked semi-trailer;
    reorienting the parked semi-trailer while the stabilizing device bears the weight of the forward portion of the parked semi-trailer so a floor of the parked semi-trailer goes from a substantially parallel orientation to an approximately non-parallel orientation with respect to a floor of the loading dock by repositioning at least one of the lift and a landing gear of the parked semi-trailer; and,
    maintaining the lift in the weight bearing position and with the floor in the approximately non-parallel orientation while contents are at least one of unloaded from or loaded onto the parked semi-trailer at the loading dock.

2. The method of claim 1, wherein the act of reorienting the parked semi-trailer includes repositioning the landing gear of the parked semi-trailer so the lift associated with the portable stabilizing device bears all the weight of the forward portion of the parked semi-trailer.

3. The method of claim 1, wherein the act of reorienting the parked semi-trailer includes repositioning the landing gear of the parked semi-trailer and repositioning of the lift so the lift and the landing gear bear all the weight of the forward portion of the parked semi-trailer.

4. The method of claim 1, wherein the act of reorienting the parked semi-trailer includes repositioning of the lift so the lift bears all the weight of the forward portion of the parked semi-trailer.

5. The method of claim 1, wherein the act of reorienting the parked semi-trailer includes repositioning the landing gear of the parked semi-trailer so the lift associated with the portable stabilizing device bears at least some of the weight of the forward portion of the parked semi-trailer.

6. The method of claim 1, wherein the act of reorienting the parked semi-trailer includes:
    repositioning the lift so the lift bears at least some of the weight of the forward portion of the parked semi-trailer;
    repositioning the landing gear to discontinue contact with the ground so that the lift bears all of the weight of the forward portion of the parked semi-trailer; and,
    repositioning the lift while the lift bears all of the weight of the forward portion of the parked semi-trailer.

7. The method of claim 1, further comprising repositioning a tailhold, operatively coupled to the lift, between a raised position and an engaged position, where the engaged position couples the tailhold to the ground and the raised position does not directly couple the tailhold to the ground.

8. The method of claim 1, further comprising disengaging a transport vehicle from underneath of the forward portion of the parked semi-trailer prior to positioning the portable stabilizing device underneath the forward portion of the parked semi-trailer, proximate a king pin.

9. The method of claim 1, wherein the floor of the parked semi-trailer is substantially parallel to a floor of the loading dock immediately following the transport vehicle being disengaged from the forward portion of the parked semi-trailer.

10. The method of claim 1, further comprising actively monitoring changes in orientation of the parked semi-trailer using at least one of visual feedback from a spirit level and electronic feedback from an inclinometer.

11. The method of claim 1, wherein the act of positioning the lift includes positioning the lift to engage at least one of a king pin and a pin box of the parked semi-trailer.

12. A method of reorienting a parked semi-trailer, the method comprising:
    activating a jack, configured to selectively operatively engage an underside of a parked semi-trailer and the ground, to operatively engage the underside of the parked semi-trailer and the ground while landing gear of the parked semi-trailer are in contact with the ground, wherein when the jack initially operatively engages the underside of the parked semi-trailer, a floor of the parked semi-trailer is at a first angle with respect to a horizontal level plane;
    activating the jack, while operatively engaging the underside of the parked semi-trailer and the ground, to change a distance between the underside of the parked semi-trailer and the ground, wherein the floor of the semi-trailer has a second angle with respect to the horizontal level plane post changing the distance, where the second angle is greater than is the first angle;
    maintaining the second angle to at least one of remove contents from the semi-trailer and load contents onto the semi-trailer.

13. The method of claim 12, further comprising raising the landing gear of the parked semi-trailer after the jack operatively engages the underside of the parked semi-trailer and before the parked semi-trailer floor reaches the second angle.

14. The method of claim 12, further comprising lowering the landing gear of the parked semi-trailer after the parked semi-trailer floor reaches the second angle.

15. The method of claim 14, wherein:
    the act of lowering the landing gear includes having the landing gear contact the ground; and,
    the act of activating the jack to change the distance includes maintaining the operative engagement between the jack and the ground.

16. The method of claim 12, wherein the act of activating the jack to operatively engage the underside of the parked semi-trailer and the ground includes continuing engagement between a landing gear of the parked semi-trailer and the ground.

17. The method of claim 12, wherein maintaining the second angle to at least one of remove contents from the semi-trailer and load contents onto the semi-trailer occurs at a loading dock.

18. The method of claim 12, further comprising repositioning a tailhook, operatively coupled to the jack, between a raised position and an engaged position, where the engaged position couples the tailhook to the ground and the raised position does not directly couple the tailhook to the ground.

19. The method of claim 12, wherein:
the act of activating the jack to operatively engage the underside of the parked semi-trailer and the ground includes utilization of an electronic controller to govern activation of the jack; and,
the act of activating the jack to change a distance between the underside of the parked semi-trailer and the ground includes utilization of the electronic controller to govern activation of the jack.

20. The method of claim 12, wherein:
the act of utilizing the electronic controller to govern activation of the jack to change the distance between the underside of the parked semi-trailer and the ground includes the controller receiving a signal from a sensor associated with at least one of the parked semi-trailer and the jack; and,
the signal provides information about changes in position of at least one of the parked semi-trailer and the jack indicative of an angle of the floor of the parked semi-trailer with respect to the horizontal level plane.

21. The method of claim 12, further comprising repositioning the jack underneath a forward portion of the parked semi-trailer while the landing gear of the parked semi-trailer engages the ground, wherein the position of the landing gear with respect to the ground coincides with the floor of the parked semi-trailer and the ground being approximately non-parallel to one another.

22. The method of claim 12, wherein the act of activating the jack to change the distance between the underside of the parked semi-trailer and the ground coincides with the floor of the parked semi-trailer and the ground being initially angled less than ten degrees with respect to one another.

23. The method of claim 12, further comprising operatively coupling the jack to a ground mount fixedly attached to the ground by repositioning a tailhook operatively coupled to the jack between a raised position and an engaged position, where the engaged position couples the tailhook to the ground and the raised position does not directly couple the tailhook to the ground.

* * * * *